BLOWER DISCHARGE VOLUME CONTROL

Original Filed Oct. 18, 1951 3 Sheets-Sheet 1

INVENTOR.
MALCOM W. PATRICK
BY
West & Oldham
ATTORNEYS

BLOWER DISCHARGE VOLUME CONTROL

Original Filed Oct. 18, 1951 3 Sheets-Sheet 2

INVENTOR.

BY MALCOM W. PATRICK

West & Oldham

ATTORNEYS

BLOWER DISCHARGE VOLUME CONTROL

Original Filed Oct. 18, 1951 3 Sheets-Sheet 3

INVENTOR.
MALCOM W. PATRICK
BY
West & Oldham
ATTORNEYS

United States Patent Office

Re. 24,421
Reissued Jan. 28, 1958

24,421

BLOWER DISCHARGE VOLUME CONTROL

Malcom W. Patrick, Cleveland Heights, Ohio, assignor, by mesne assignments, to Hupp Corporation, Detroit, Mich., a corporation of Virginia Original No. 2,721,704, dated October 25, 1955, Serial No. 251,912, October 18, 1951. Application for reissue February 1, 1956, Serial No. 562,917

10 Claims. (Cl. 236—10)

Matter enclosed in heavy brackets [ ] appears in the original patent but forms no part of this reissue specification; matter printed in italics indicates the additions made by reissue.

This invention resides in means for varying and controlling the amount of fluid discharged from a centrifugal impeller or blower while the same is being driven at a substantially constant or uniform speed; and, within its scope, the invention comprehends an automatic control for such means.

The invention was conceived and developed in connection with forced draft furnaces of heating systems, principally of the recirculating type, used for heating houses, apartments or the like. Accordingly, I have herein disclosed the invention in such connection, but without intent of limiting it to this particular application.

Centrifugal blowers are commonly employed for impelling air through the heating or plenum chambers of furnaces of the above class, and on through the distributing part of the system to the living quarters or other space to be heated. Where the furnace is employed in a heating system of the recirculating type, it includes a so-called fan compartment wherein the blower is situated. When in operation, the blower draws air into the fan compartment through one or more return ducts, and a filter is customarily included for cleaning the air as it is drawn into the fan compartment.

As is generally known, such furnaces are usually rendered automatic in operation by means of electrical control systems involving a room thermostat; and the blower is operated by an electric motor in circuit with a thermostatic switch that is subjected to the temperature of the air in the heating or plenum chamber of the furnace. The furnace involves a combustion apparatus or burner in which a suitable fuel, such as gas or oil, is used, and the apparatus or burner is equipped with an igniter or pilot light.

When the combustion apparatus or burner is not operating, or is at pilot fire, there is insufficient heat in the heating or plenum chamber of the furnace to close the aforesaid thermostatic switch and cause energization of the blower motor. However, as soon as the room thermostat calls for heat, the control system acts in the conventional manner to deliver fuel to the burner, and to ignite the fuel and thus initiate a heating cycle. When the temperature in the heating or plenum chamber rises to a given value, say 110° to 120° F., the aforesaid thermostatic switch closes and causes energization of the blower motor and air is circulated through the fan compartment and the heating or plenum chamber of the furnace and through the usual distributing and return ducts. The foregoing operation will be recognized as that of a house heating system of common and well known recirculating type. Sometimes, especially with oil burning furnaces, there is an additional stage of burner operation to the low or pilot and high fire stages, namely, the so-called intermediate fire stage; and, in such cases, the control system, and the room thermostat that forms a part thereof, are modified to accomplish a stepping-up and a stepping-down of burner operation as temperature changes require. In some such instances, the blower is operated at multiple speeds, the R. P. M. of the blower motor increasing as the fire advances, and vice versa.

In the operation of heating systems of the above described character, whether or not the blower motor is multiple speed, there is a surge of relatively cool air into the living quarters when the blower starts operating. This causes momentary discomfort to the occupants of such quarters as there is a feeling of chilliness at a time when additional warmth is needed. This results from the sudden starting of the blower at maximum speed and capacity, in the case of a one-speed motor, or at a speed and capacity much in excess of what it should be at the beginning of the circulation of air, in the case of a two-speed motor. Because of the fact that the blower immediately starts operating at such a velocity and output, the cool air in the distributing [duct] *ducts* of the system is blown into the living quarters with the effect of a blast or surge that results in the aforesaid discomfort to the occupants; and this condition prevails more or less until the heated air has attained maximum temperature in the heating or plenum chamber and has had time to reach the living quarters and become generally diffused throughout the same.

Various means have been devised for overcoming this defect, some including conventional dampers located either in advance of the inlet of the blower or beyond the outlet thereof, but none has proved satisfactory.

An object of my invention is to provide a very simple and relatively inexpensive, yet thoroughly efficient and reliable means for varying and controlling the volume of fluid or air discharged from a centrifugal impeller or blower while the latter is operating at substantially constant speed, without decreasing the efficiency at high delivery rates or introducing excessive turbulence or "air noise" at reduced delivery rates.

Another object is to provide a thermostatic control that adapts the invention to heating systems of the character above described and which control functions automatically to cause said means to regulate the volume of air discharged by the blower in accordance with the temperature of the air delivered to the space or quarters being heated, thereby to overcome the undesirable effect above pointed out.

Another object of the invention is to provide simple means of adjustment for readily accomplishing the proper relationship between the thermostatic control and the volume varying and controlling means, hereinafter termed the restrictor.

A further object is to provide a device that is convenient of manipulation for retaining the restrictor in ineffective or non-restricting position so that the blower may be used for circulating a maximum volume of relatively cool air through the system for summer-time cooling.

A still further object is to provide a construction that will simplify the installation of my invention in a conventional forced draft furnace, including a duct member for emplacement in the fan compartment and by which air from the heating or plenum chamber is conducted into intimate heat exchange relation to the thermostatic control under the influence of negative pressure created by the blower action.

A still further object is to provide means of the aforesaid character that operates smoothly and quietly.

Other objects and advantages will appear is I proceed to describe the invention by reference to the accompanying drawings wherein like characters designate like parts throughout the several views.

Figure 1:
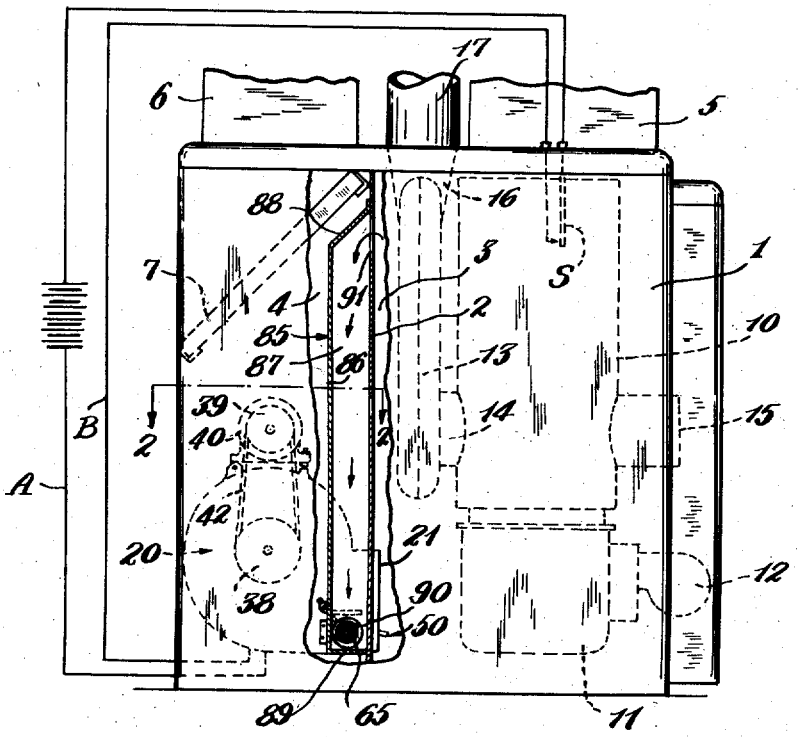
Fig. 1 is a side elevational view of a forced draft furnace equipped with my invention, parts being broken away to reveal the thermostatic control for the restrictor, and the duct through which air is conducted from the heating or plenum chamber of the furnace to said thermostatic control, the character of the view being better understood by reference to line 1—1 of Fig. 2.
Figure 2:
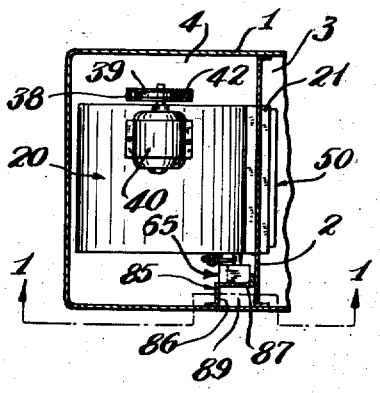
Fig. 2 is a fragmentary sectional plan view of the furnace, taken on the line 2—2 of Fig. 1.

The forced draft furnace with which I have shown my invention associated in Figs. 1 and 2 comprises, generally, a casing 1 that is separated by a vertical transverse partition 2 into a heating or plenum chamber 3 and a fan compartment 4. A bonnet 5 surmounts the front end of the casing and is in communication with the chamber 3 and constitutes, in effect, an upward extension thereof, and ordinarily the space enclosed thereby is referred to as the plenum chamber. Mounted upon the rear portion of the casing above the fan compartment 4 and communicating therewith is a return duct 6. As is generally well known, the distributing ducts of the heating system lead from the bonnet 5, and if there are more than one cold air return conduit, as when leading from individual rooms, they open into the return duct that I have designated 6. Mounted within the fan compartment 4 is a filter screen 7 through which the return air is drawn.

Situated within the heating or plenum chamber 3 is the combustion chamber casing 10, and suitably supported therebelow is the combustion apparatus or burner 11 which discharges its products upwardly into the combustion chamber. Incidentally, the combustion apparatus or burner 11 is illustrated as of the oil burning variety and combustion air is supplied thereto by a fan 12. 13 designates a radiator that is arranged within the heating of plenum chamber 3 rearwardly of the combustion chamber casing 10 and it communicates with the latter through a stub 14. Extending forwardly from the combustion chamber casing in approximate alignment with the stub 14 in the usual cleanout extension 15. A flue connection 16 rises from the upper end of the radiator 13 through an opening in the top of the casing 1 and a pipe 17 leads therefrom to a chimney (not shown).

A centrifugal impeller or blower, designated, generally, by the reference numeral 20, is supported in the usual way in the lower portion of the fan compartment 4, and the discharge neck 21 of the snail shell casing of the blower projects through an opening in the partition 2 into the lower part of the heating or plenum chamber 3.

Figure 3:
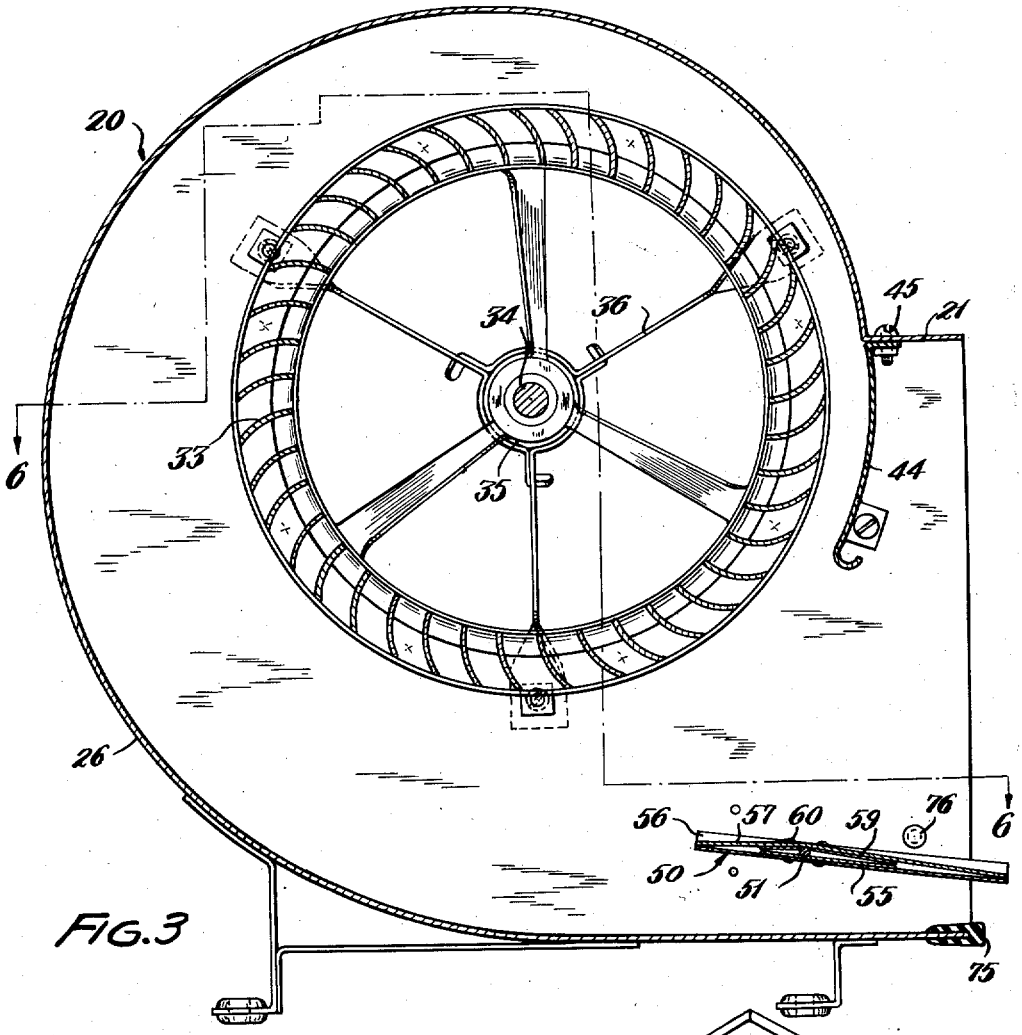
Fig. 3 is a sectional side elevation of the centrifugal blower showing the restrictor of my invention incorporated therein and intermediate its fully restricting and non-restricting positions.
Figure 6:
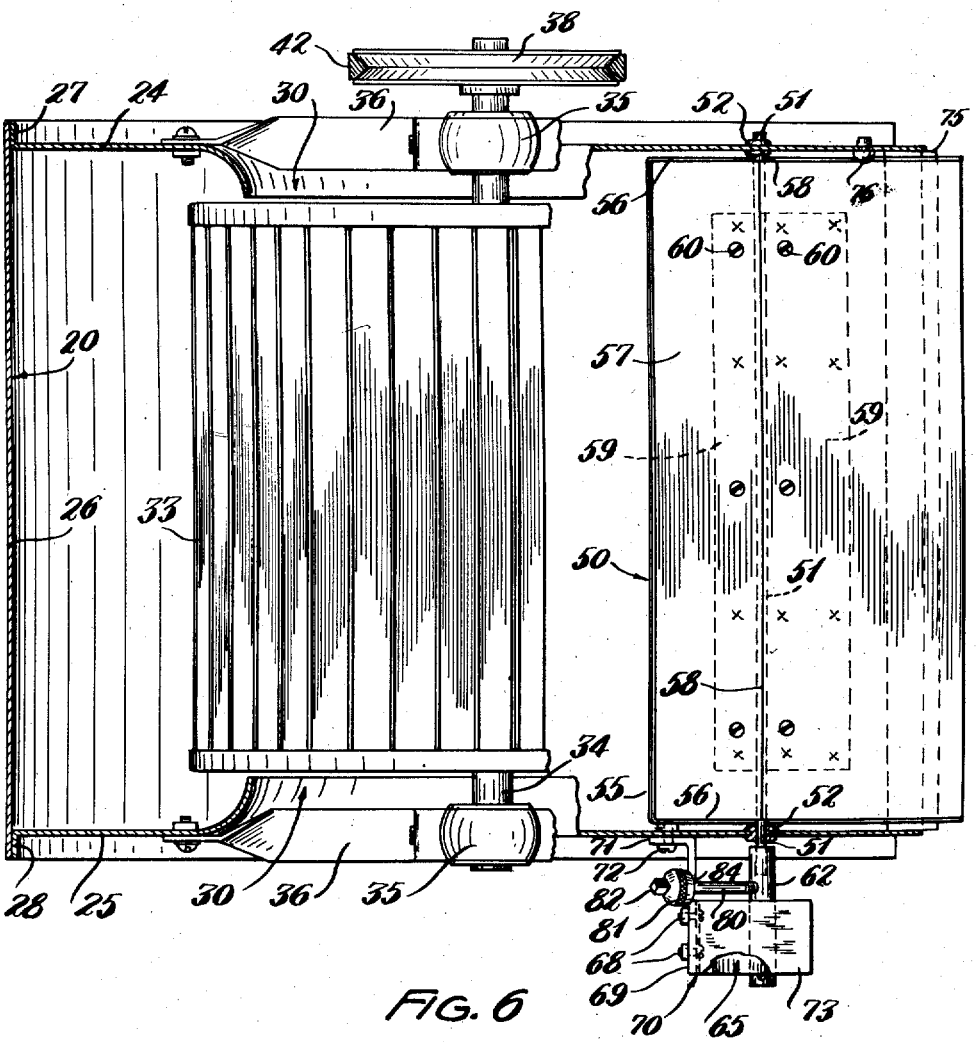
Fig. 6 is a horizontal section through the blower, substantially on the line 6—6 of Fig. 3.

As best shown in Figs. 3 and 6, the casing of the blower comprises end walls 24 and 25, and a peripheral wall 26; and into the ends of the latter, the former walls 24 and 25 are inset to the depth of their respective edge [flange]

*flanges* 27 and 28. The end walls 24 and 25 are provided with relatively large circular openings 30 about which the material of the walls is gradually curved inwardly and it is through these openings that air is drawn from the fan compartment 4 when the squirrel cage rotor or fan wheel 33 of the blower is rotated. The design and construction of the rotor or wheel follows standard practice, and a shaft 34 whereon the rotor or wheel is fixedly mounted is journaled in bearings 35. These bearings are supported centrally of the openings 30 by spiders 36 that are attached to the end walls of the blower casing. Secured to the end of the shaft 34 beyond the end wall 24 is a pulley 38. This pulley is in the vertical plane of one designated 39 that is secured to the shaft of a motor 40 that is mounted in the customary way on the top of the casing of the blower 20. An endless belt 42 is engaged about the pulleys 38 and 39. Accordingly, it will be seen that when the motor 40 is energized it will drive the rotor or wheel 33, in the present instance at a speed less than that of the motor due to the fact that the pulley 38 is greater in diameter than the pulley 39. While the vertical dimension of the neck 21 of the blower casing exceeds the diameter of the rotor or wheel 33 and is more than half the height of the casing, its effective area is reduced by a cut-off 44, which is shown as attached to the top wall of the neck, as by bolts 45, and lies substantially within the extended curved surface of the adjacent portion of the peripheral wall of the casing. For my purpose, I shall refer to the general region or space between the lower edge of the cut-off 44 and the portion of the peripheral wall of the blower casing approximately opposite said edge, as the throat of the blower, said region extending inwardly of the vertical plane of the cut-off 44 beneath the adjacent side of the wheel or rotor 33. It is within this particular region or throat that I pivotally support the restrictor that constitutes the essential element of my invention, and the same is so located that its operation is confined to that portion of the throat adjacent the peripheral wall of the blower casing where, due to the centrifugal action of the rotor or wheel 33, the volume of the impelled air is the greatest.

The restrictor, designated generally by the reference numeral 50, is secured to a shaft 51 that is shown as journaled in bearings 52, preferably constituted of grommets made of a rubber composition especially suited to such purposes, and mounted in holes in the end walls 24 and 25.

Figure 7:
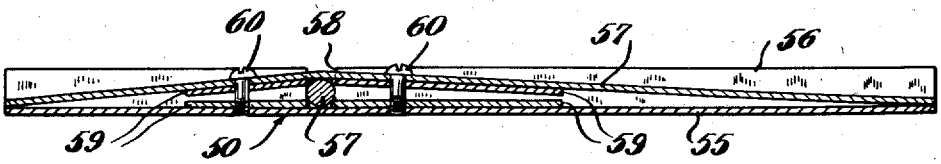
Fig. 7 is an enlarged sectional detail of the restrictor.

As will best appear from Figs. 6 and 7, the restrictor 50 comprises a flat bottom plate 55, having shallow upturned flanges 56 at its opposite ends, and a slightly curved top plate 57 of a length to fit between said end flanges. The shaft 51 is disposed between the top and bottom plates and is accommodated by notches 58 in the end flanges 56 of the bottom plate. Secured, as by spot welding, to the inner surfaces of the top and bottom plates, are backing strips 59, formed from sheet metal of suitable gauge, and the upper and lower backing strips are provided with registering holes for fastening means, such as screws 60, the holes of the lower backing strips being threaded for cooperation with said screws. As best appears from Fig. 7, the adjacent edges of the backing strips firmly contact, or slightly embed themselves in, the shaft 51 so as to firmly hold the restrictor in place upon the shaft. It will be observed that the shaft 51, which is parallel with the longitudinal edges of the restrictor, is considerably nearer the "leading" or inner edge, than the outer or "trailing" edge.

Figure 4:
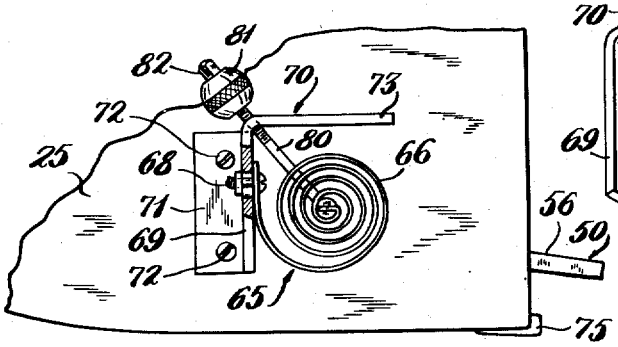
Fig. 4 is a fragmentary side elevational view of the blower, showing the thermostatic control.
Figure 5:
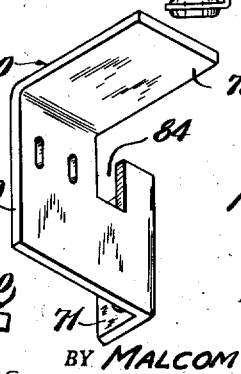
Fig. 5 is a perspective view of the bracket of said control.

Secured to the end of the shaft 51, where it extends beyond the end wall 25, is the arbor 62 of the thermostatic control, designated generally by the reference numeral 65. The thermosensitive element 66 of said control consists, in the present instance, of a bimetal strip of spiral formation, having its inner end engaged within a diametrical slot of the arbor 62, and its opposite or outer end attached, by bolts 68, to a vertical wall 69 of a bracket designated generally by the reference numeral 70. The bracket has a base flange 71 that is attached, as by bolts 72, to the end wall 25 of the blower casing, and extending over the thermosensitive element 66, from the top *edge* of the wall 69, is a wing 73. As shown in Figs. 4 and 5, the bolts 68 extend through slots in the wall 69 of said bracket. Accordingly the outer end of the thermostatic element 66 may be adjusted with respect to the bracket in order to take care of manufacturing tolerances. Another or second adjustment is provided, in this instance between the restrictor 50 and shaft 51, by means of which the thermostatic element 66 may be placed under tension when the trailing edge of the restrictor bears against a cushion 75 of rubber or the like, shown as a channel that embraces the edge of the wall that defines the bottom of the neck 21, and when a temperature at or below a normal room temperature exists. The second adjustment is accomplished by loosening the screws 60 to relax the hold of the backing strips 59 upon the shaft 51, turning the shaft with respect to the restrictor in a direction to place the thermostatic element under the desired relatively slight tension while the trailing edge of the resistor bears against said cushion, and then tightening said screws to bind the restrictor to the shaft. With the parts thus conditioned, there is no likelihood of the restrictor vibrating and causing noise.

Responsive to the action of the thermostatic element 66, when the latter is heated, as will hereinafter more fully appear, the restrictor 50 swings toward a horizontal position; and to prevent it from moving beyond such position, a stop 76 is attached in an appropriate location to the end wall 24 of the blower casing. The stop 76 is desirably made of a rubber composition and is provided with a neck intermediate its enlarged inner and outer ends that occupies a hole in the casing wall. Since the cushion 75 and stop 76 are made of a rubber composition, and the bearings or grommets 52 are of similar material, no noise will be made by contact of the restrictor with the cushion and stop, or by reason of relative vibration of the restrictor shaft 51 and the end walls of the blower casing.

As a summertime convenience, a device is provided for holding the restrictor in [effective] *ineffective* or non-restricting position, against the stop 76, so that the blower is made to operate continually at full capacity for summer air conditioning. Such device, in the present instance, consists of an arm 80 that is secured to and extends laterally from the arbor 62, and on the outer end of which is threaded a spherical nut 81, so that the same may be adjusted along the arm. A cap 82 is desirably applied to the terminal portion of the arm to prevent withdrawal of said nut from the arm. The vertical wall 69 of the bracket 70 is provided with a notch 84 that opens through the top edge of said wall and provides clearance for the arm 80 as it swings back and forth during normal operation of the thermostat. However, for the purpose above explained, the arm 80 is swung to the bottom of the notch 84 and the nut 81 adjusted inwardly along the arm into contact with the vertical wall of the bracket, thereby to hold the restrictor in ineffective or non-restricting position against the stop 76.

With the blower installed in the furnace as previously described, and as shown in Figs. 1 and 2, an elongated duct member 85 is disposed vertically within that corner of the fan compartment 4 occupied by the thermostat 65. It is clear from Figs. 1 and 2 that the duct member 85, which is preferably formed of sheet metal, includes right-angularly related walls 86 and 87, that are flanged along their free vertical edges and are engaged, respectively, with the adjacent vertical side wall of the furnace casing, and with the partition 2, so as to enclose between itself and said wall and partition a duct that is closed at top and bottom by the respective walls 88 and 89. A hole 90 is made in the wall 87 in proximity to the thermostat 65, and an opening 91 in the partition 2 provides communication between the heating or plenum chamber 3 and the duct enclosed by the member 85.

Since the electrical control system that governs the operation of the furnace and renders it automatic constitutes no part of my invention, and may consist of any one of many well known types, I have not disclosed it herein further than to include in Fig. 1 a diagrammatic representation of the circuit that includes the blower motor and the thermostatic switch that is subjected to the temperature of the air in the heating or plenum chamber 3 of the furnace.

Assuming that the furnace is in operation and that the control system, by reason of the fact that the room thermostat is calling for heat, has functioned to deliver fuel to the combustion apparatus or burner 11, and the fuel has been ignited to initiate a heating cycle, the temperature of the air in the heating or plenum chamber 3 will gradually rise. It should be remembered in this connection that, with the thermostat 65 cool, as at present, the restrictor 50 is full restricting position with its outer or trailing edge in contact with the cushion 75. When the temperature of the air in the chamber 3 has reached a given value—anywhere from 110° to 120° F., for example, the thermostatic switch, designated S in Fig. 1, operates to close the blower motor circuit represented by the conductors A and B, and this starts the blower in operation—practically instantly at maximum speed. Under present conditions the air in the distributing ducts of the heating system is cool, making it undesirable to blast it into the living quarters, for reasons already explained. Although the blower is operating at full speed, it is discharging air into the heating or plenum chamber 3 at a very low rate, or, in other words, at a very low percentage of its maximum volume, due to the fact that the restrictor 50 is presently in its most effective or full restricting position. Obviously, some circulation must occur under prevailing conditions in order to clear the distributing ducts of the cool air, but it should be at such a low rate that the occupant of the living quarters would not be conscious of it.

With the blower in operation, a negative pressure is created in the fan compartment 4 due in part to the restrictive action of the filter element 7. This causes air to be drawn into said compartment, not only through the usual return duct 6, but through the duct defined by the duct member 85 as well. The latter duct, as previously explained, communicates with the heating or plenum chamber 3 through the opening 91, and with the fan compartment through the opening 90. Accordingly, the heated air from the chamber 3 will gradually so affect the thermosensitive element 66 of the thermostat as to cause it to rotate the arbor 62, and consequently the restrictor 50, to the shaft 51 of which said arbor is secured, in a counter-clockwise direction (as the parts are viewed in Figs. 1, 4 and 3), the restrictor slowly moving toward the stop 76. During this moderate progressive movement of the restrictor, the velocity and volume of the air flowing through the chamber 3 and through the distributing duct of the heating system very gradually accelerates and increases in conformity with the rise in temperature of the air. Consequently, the occupants of the living quarters will experience no feeling of chilliness but will be conscious only of comfort and warmth.

For a more comprehensive understanding of the foregoing, it might be well to explain that, although the blower starts operating when the temperature in the heating or plenum chamber 3 of the furnace is within the range of say 110° to 120° F., the restrictor 50 does not reach its ineffective or non-restricting position, wherein it engages the stop 76, until the air temperature in the chamber 3 has attained a value of from 150° to 160°. Such a temperature must prevail in said chamber when the blower is supplying air at its full capacity, in order to insure a feeling of warmth and comfort to the occupants of the living quarters.

The reverse action of the restrictor is obvious from the foregoing. When the temperature substantially throughout the living quarters has attained the maximum value for which the room thermostat is set, and the control system accordingly functions to shut off the supply of fuel to the burner, thus concluding a heating cycle, the blower will continue to operate until the temperature in the chamber 3 of the furnace falls below, say 110°. However, during this decline of temperature, the thermostat 65 will be so affected as to cause the gradual return of the restrictor to full restricting position. In other words, the volume of air discharged into the living quarters during this time will be proportionate to its temperature.

It will be noted, especially from Figs. 3 and 7, that the restrictor 50 has a streamline effect in cross section, due to which fact it offers practically no obstruction to the flow of air when in non-restricting position.

Having thus described my invention, what I claim is:

1. A volume control for centrifugal blowers of the conventional type comprising a snail shell casing made up of end walls and a volute peripheral wall and having a neck and a throat that is spaced inwardly from the neck, and a fan wheel rotatable within the casing on an axis extending through said end walls and in eccentric relation to the peripheral wall; said volume control consisting of a restrictor situated in the throat of the blower casing, a [shift] *shaft* rotatably supported by the end walls of the casing in substantially parallel relation to the axis of the fan wheel and to which the restrictor is secured against relative rotation, said shaft supporting the restrictor with its trailing edge portion in said neck, said trailing edge portion being adapted to swing between the side of the neck furthest from the axis of the fan wheel and a position spaced from said side of the neck a distance approximately equal to the spacing of said shaft from the nearest part of the peripheral wall of the casing, stop means arresting movement of the restrictor when it attains second position, one end of the shaft extending beyond an end wall of the casing, a thermostat control assembly including an arbor fixed to said end of the shaft in substantially axial alignment therewith, a resilient bimetal strip of spiral formation having its inner end connected to the arbor, a bracket secured to the last mentioned end wall of the casing and having a part substantially parallel to the arbor, and means adjustably connecting the outer end of said strip to said part of the bracket whereby the bimetal strip may be placed under tension when the trailing edge portion of the restrictor is in engagement with said side of the neck, the bimetal strip tying the arbor and bracket of the thermostat control assembly together.

2. A volume control for centrifugal blowers of the type comprising a snail shell casing made up of end walls and a volute peripheral wall and having a neck and a throat that is spaced inwardly from the neck, and a fan wheel rotatable within the casing on an axis extending through said end walls and in eccentric relation to the peripheral wall; said volume control consisting of a restrictor situated in the throat of the blower casing, a shaft rotatably supported by the end walls of the casing in substantially parallel relation to the axis of the wheel, said shaft supporting the restrictor with its trailing edge portion in said neck, said trailing edge portion being adapted to swing between a first position at the side of the neck furthest from the axis of the fan wheel and a second position spaced from said side of the neck a distance approximately equal to the spacing of said shaft from the nearest part of the peripheral wall of the casing, one end of the shaft extending beyond an end wall of the casing, an arbor fixed to said end of the shaft in substantially axial alignment therewith, a bimetal strip of spiral formation having its inner end connected to the arbor, a bracket secured to the last mentioned end wall of the casing and having a part substantially parallel to the arbor, means connecting the outer end of said strip to said part of the bracket, an arm extending laterally from said arbor, and means for securing said arm to the bracket when the trailing edge portion of the restrictor occupies the aforesaid second position.

3. For incorporation in forced draft furnaces characterized by a rectangular casing and a vertical partition dividing said casing into a heating or plenum chamber and a fan compartment, the partition having an opening adjacent its lower end, a centrifugal blower located in the fan compartment and comprising a snail shell casing having a neck communicating with said chamber through the opening in the partition, and a fan wheel rotatably supported in the blower casing; a volume control consisting of a restrictor pivotally supported for swinging movement on an axis extending transversely of the casing immediately inwardly of said neck and relatively close to the peripheral wall of the casing, a thermosensitive element located outside the blower casing within the fan compartment adjacent the aforesaid partition and having operative connection with the restrictor, and a duct member arranged vertically within the angle between the partition and the side wall of the first mentioned casing nearest said thermosensitive element thereby to form with said partition and wall a vertical duct, the partition having an opening through which said chamber communicates with the duct adjacent the upper end thereof, and said duct member having an aperture in close proximity to the thermosensitive element through which the duct discharges into the fan compartment.

4. A volume control for centrifugal blowers of conventional type comprising a snail shell casing made up of end walls and a peripheral wall and having a neck and a throat that is spaced inwardly from the neck, and a fan wheel rotatable within the casing on an axis extending through said end walls and in eccentric relation to the peripheral wall; said volume control consisting of a restrictor pivotally supported in the throat of the blower casing for swinging movement on an axis substantially parallel to that of the fan wheel and with its trailing edge portion in said neck, the pivotal axis of said restrictor being located in the throat nearer the side thereof that is more remote from the fan wheel axis, means for imparting movement to the restrictor to swing its trailing edge within a range defined at one limit by the side of the neck furthest from the axis of the fan wheel and at the other limit by a position spaced from said side of the neck a distance approximately equal to the spacing of the pivotal axis of the restrictor from the nearest part of the peripheral wall of the casing, a shaft for the restrictor defining the pivotal axis thereof, the restrictor consisting of a flat rectangular plate engaged with one side of the shaft and having shallow end flanges extended toward, and notched to receive, the shaft, and a second rectangular plate disposed between said end flanges and engaged with the opposite side of the shaft and deflected laterally thereof in both directions to position the lateral edges of the second plate in close proximity to the corresponding edges of the first mentioned plate.

5. A volume control for centrifugal blowers of conventional type comprising a snail shell casing made up of end walls and a peripheral wall and having a neck and a throat that is spaced inwardly from the neck, and a fan wheel rotatable within the casing on an axis extending through said end walls and in eccentric relation to the peripheral wall; said volume control consisting of a restrictor pivotally supported in the throat of the blower casing for swinging movement on an axis substantially parallel to that of the fan wheel and with its trailing edge portion in said neck, the pivotal axis of said restrictor being located in the throat nearer the side thereof that is more remote from the fan wheel axis, means for imparting movement to the restrictor to swing its trailing edge within a range defined at one limit by the side of the neck furthest from the axis of the fan wheel and at the other limit by a position spaced from said side of the neck a distance approximately equal to the spacing of the pivotal axis of the restrictor from the nearest part of the peripheral wall of the casing, a shaft for the restrictor defining the pivotal axis thereof, the restrictor consisting of a flat rectangular plate engaged with one side of the shaft, and a second rectangular plate engaged with the opposite side of the shaft and deflected laterally thereof in both directions to position the lateral edges of the second plate in close proximity to the corresponding edges of the first mentioned plate, backing strips secured to the inner surfaces of both plates laterally of and closely adjacent the shaft, the two plates and the backing strips having registering holes, those of one plate and the corresponding backing strips being aligned with those of the other plate and strips, and fastening means extended through said aligned holes for binding the plates together and to said shaft.

*6. A volume control for centrifugal blowers of the type comprising a snail shell casing including end walls and a volute peripheral wall and having a neck and a throat that is spaced inwardly from the outer end of the neck and a fan wheel rotatable within the casing on an axis in eccentric relation to the peripheral wall, said volume control comprising a plate-like member, a shaft rotatably supported by the end walls of the casing and in substantially parallel relation to the axis of the fan wheel, said member being rigid with said shaft, said shaft supporting said member with its trailing edge positioned adjacent the the outer end of said neck, said trailing edge being adapted to swing between a first position at the side of the neck farthest from the axis of the fan wheel and a second position spaced from the side of the neck a distance approximately equal to the spacing of the shaft and the nearest part of the peripheral wall of said casing, stop means disposed in the path of said member and adapted to arrest movement of said member when it reaches said second position, one end of the shaft extending beyond an end wall of the casing, a resilient bi-metal strip of spiral formation having its inner end operatively connected to said end of said shaft outwardly of said end casing wall, and means securing the outer end of said strip to said casing outwardly thereof whereby the bi-metal strip is positioned out of the path of air delivered by said blower.*

*7. A volume control for centrifugal blowers of the type comprising a snail shell casing including end walls and a volute peripheral wall and having a neck and a throat that is spaced inwardly from the outer end of the neck and a fan wheel rotatable within the casing on an axis extending through said end walls and in eccentric relation to the peripheral wall, said volume control comprising a plate-like member, a shaft rotatably supported by the end walls of the casing and in substantially parallel relation to the axis of the fan wheel, said member being secured to said shaft with its trailing edge substantially farther from the shaft than its leading edge said shaft supporting said member with its trailing edge positioned adjacent the outer end of said neck, said trailing edge being adapted to swing between a first position at the side of the neck farthest from the axis of the fan wheel and a second position spaced from the side of the neck a distance approximately equal to the spacing of the shaft and the nearest part of the peripheral wall of said casing, stop means disposed in the path of said member and adapted to arrest movement of said member when it reaches said second position, one end of the shaft extending beyond an end wall of the casing, a resilient bi-metal strip of spiral formation having its inner end operatively connected to said end of said shaft outwardly of said end casing wall, and means securing the outer end of said strip to said casing outwardly thereof whereby the bi-metal strip is positioned out of the path of air delivered by said blower.*

*8. For use in a forced draft hot air heating system having a furnace provided with a chamber containing a heating element, said chamber being in communication with the space to be heated, said system also having a blower assembly including a snail shell casing provided with a neck connected with said chamber and a fan wheel rotatably supported in said casing: a control for regulating the volume of air caused to pass through said chamber by said blower assembly comprising a plate-like member supported for pivotal movement about an axis substantially parallel with the axis of said fan wheel, said axis being disposed adjacent the inner end of said neck and relatively close to the outer wall of said casing, the trailing edge of said member being adapted to swing between a first flow restricting position at the side of the neck farthest from the axis of the fan wheel and a second position spaced from the side of the neck a distance substantially equal to the spacing of the axis of said member from the nearest part of the outer wall of said casing, whereby said member permits a reduced flow of air through said neck in said first position and permits substantially unrestricted air flow through said neck in said second position, stop means arresting movement of said member when it reaches said second position, a thermo-sensitive element adapted to urge said member toward said first position when cold to thereby reduce the rate at which relatively cool air is delivered to the space to be heated when said heating element and said blower are first activated to avoid objectionable drafts therein, said thermo-sensitive element also being adapted to urge said member toward said second position when it is warm, and means for raising the temperature of said thermo-sensitive element above the temperature of the air being delivered by said blower to thereby gradually increase the rate at which air is delivered by said blower.*

*9. The combination according to claim 8 wherein said plate-like member is offset in a downstream direction with respect to its axis of pivotal movement whereby said plate-like member is stabilized by the flow of air delivered by said blower.*

*10. For use in a forced draft hot air heating system having a furnace provided with a chamber containing a heating element the outlet of said chamber being in communication with a space to be heated, said system also having a blower assembly including a snail shell casing provided with a neck connected with the inlet of said chamber and a fan wheel rotatably supported in said snail casing: an air volume control for regulating the volume of air delivered by said blower assembly to said chamber comprising a plate-like member supported for pivotal movement about an axis substantially parallel with the axis of said fan wheel, said axis being disposed adjacent the inner end of said neck and relatively close to the peripheral wall of said shell casing, the trailing edge of said member being adapted to swing between a first flow restricting position at the side of the neck farthest from the axis of the fan wheel and a second position spaced from the side of the neck a distance approximately equal to the spacing of the axis of said member from the nearest part of the peripheral wall of said shell casing to permit substantially unrestricted air flow, stop means arresting movement of said member when it attains said second position, a thermo-sensitive element positioned outside of said shell casing adapted to urge said member toward said first position when cold and said second position when warm whereby when said heating element and said blower are activated, said blower supplies a reduced volume of air to said chamber to thereby gradually displace the air in said system into the space to be heated to avoid objectionable drafts therein, and means for directing a flow of air from said chamber downstream of said heating element over said thermo-sensitive element to gradually increase the rate at which air is delivered by said blower as the air passing through said chamber becomes warmer.*

(References on following page)

References Cited in the file of this patent or the original patent

UNITED STATES PATENTS

| | | |
|---|---|---|
| 449,743 | Landis | Apr. 7, 1891 |
| 783,267 | Harris | Feb. 21, 1905 |
| 1,119,288 | Kurz | Dec. 1, 1914 |
| 1,532,635 | Osbun | Apr. 7, 1925 |
| 1,752,830 | Bliss | Apr. 1, 1930 |
| 1,834,958 | Martin | Dec. 8, 1931 |
| 1,956,829 | Frank | May 1, 1934 |
| 1,965,444 | Alpern | July 3, 1934 |

| | | |
|---|---|---|
| 2,075,587 | Mesinger | Mar. 30, 1937 |
| 2,156,405 | Smoot | May 2, 1939 |
| 2,255,917 | Donley | Sept. 16, 1941 |
| 2,292,082 | Miller | Aug. 4, 1942 |
| 2,308,655 | Hallinan | Jan. 19, 1943 |
| 2,385,096 | McCollum | Sept. 18, 1945 |
| 2,478,457 | Camerino et al. | Aug. 9, 1949 |
| 2,491,380 | Kutzler | Dec. 13, 1949 |

FOREIGN PATENTS

| | | |
|---|---|---|
| 7,016 | Great Britain | 1891 |